(12) United States Patent
Nowak et al.

(10) Patent No.: US 12,551,443 B2
(45) Date of Patent: *Feb. 17, 2026

(54) METHOD FOR CONTINUOUSLY PRODUCING AN ACTIVE INGREDIENT GRANULATE

(71) Applicant: ADD Advanced Drug Delivery Technologies Ltd., Pratteln (CH)

(72) Inventors: Reinhard Nowak, Binzen (DE); Norbert Pöllinger, Müllheim (DE); Annette Grave, Lörrach (DE); Michael Jacob, Weimar (DE)

(73) Assignee: ADD Advanced Drug Delivery Technologies Ltd., Pratteln (CH)

( * ) Notice: Subject to any disclaimer, the term of this patent is extended or adjusted under 35 U.S.C. 154(b) by 1073 days.

This patent is subject to a terminal disclaimer.

(21) Appl. No.: 17/602,393

(22) PCT Filed: Apr. 9, 2020

(86) PCT No.: PCT/EP2020/060278
§ 371 (c)(1),
(2) Date: May 17, 2022

(87) PCT Pub. No.: WO2020/208202
PCT Pub. Date: Oct. 15, 2020

(65) Prior Publication Data
US 2022/0280432 A1 Sep. 8, 2022

(30) Foreign Application Priority Data

Apr. 11, 2019 (EP) ..................................... 19168685

(51) Int. Cl.
*A61K 9/16* (2006.01)
*A61K 9/20* (2006.01)

(52) U.S. Cl.
CPC .......... *A61K 9/1694* (2013.01); *A61K 9/2095* (2013.01)

(58) Field of Classification Search
None
See application file for complete search history.

(56) References Cited

U.S. PATENT DOCUMENTS

| 6,159,252 A | 12/2000 | Ruediger et al. | |
|---|---|---|---|
| 2002/0136719 A1* | 9/2002 | Shenoy | A61P 37/06 424/130.1 |
| 2010/0080849 A1 | 4/2010 | Schlutermann | |
| 2022/0323361 A1* | 10/2022 | Nowak | A61K 9/1652 |

FOREIGN PATENT DOCUMENTS

| EA | 028676 B1 | 12/2017 |
|---|---|---|
| JP | H11510426 A | 9/1999 |
| RU | 2152212 C1 | 7/2000 |
| WO | WO 2004/047811 | 6/2004 |
| WO | WO 2010/106555 | 9/2010 |
| WO | WO 2018/034627 A1 | 2/2018 |

OTHER PUBLICATIONS

"Effect of Granulation Process on Compressibility of Metformin Hydrochloride Tablets", Wang et al., Chinese Journal of Pharmaceuticals, vol. 48, No. 7, pp. 1042-1047, Dec. 31, 2017.
"Theory and Practice of Solid Preparation Technology of Traditional Chinese Medicine", Feng Yi et al., China Press of Traditional Chinese Medicine, pp. 22-26, Mar. 2017 and its English machine translation.
The Japanese Pharmacopoeia, 18th Edition, General Information, p. 2524-2527 and its English machine translation.
"Theory and Practice of Solid Preparation Technology of Traditional Chinese Medicine", Feng Yi et al., China Press of Traditional Chinese Medicine, pp. 22-26, Mar. 2017.
The Japanese Pharmacopoeia, 18th Edition, General Information, p. 2524-2527.
European Medicine Agency: "Assessment report, Duloxetine Mylan", retrieved from the internet at URL: https://www.ema.europa.eu/en/documents/assessment-report/duloxetine-mylan-epar-public-assessment-report_en.pdf.
International Search Report for PCT/EP2020/060278 dated Jul. 3, 2020.
Heinrich S et al, "Analysis of the start-up process in continuous fluidized bed spray granulation by population balance modelling", *Chemical Engineering Science*, Oxford, GB, Band 57, Nr. 20, 01. Oct. 2002 (Oct. 1, 2002), pp. 4369-4390, XP004390381, DPI: 10.1016/S0009-2509(02)00352-4, ISSN:0009-2509.
Christoph Neugebauer et al, "Influence of Thermal Conditions on Particle Properties in Fluidized Bed Layering Granulation", *PROCESSES*, Band 6, Nr. 12, 22. Nov. 2018 (Nov. 22, 2018), p. 235, XP055621782, DOI: 10.3390/pr6120235.

\* cited by examiner

*Primary Examiner* — Susan T Tran
(74) *Attorney, Agent, or Firm* — Jon E. Gordon; Haug Partners LLP

(57) ABSTRACT

A method for the continuous production of an active ingredient granulate is provided, which comprises the following steps:
(a) preparing a spray composition by dissolving or dispersing an active ingredient and optionally one or more excipients in a liquid;
(b) providing solid particles in a process space;
(c) introducing droplets of the spray composition into an injection zone of the process space in which the liquid evaporates;
(d) repeatedly guiding the solid particles back past the sprayed droplets in the process space with the aid of a process gas jet, so that at least a portion of the droplets, which may have already lost part of the liquid contained, comes into contact with solid particles and larger solid particles are formed through agglomeration;
(e) removing the active ingredient granulate from the process space in the form of solid particles,
wherein the active ingredient in the form used has a Hausner factor of 1.19 or greater.

21 Claims, 4 Drawing Sheets

METHOD FOR CONTINUOUSLY PRODUCING AN ACTIVE INGREDIENT GRANULATE

CROSS-REFERENCE TO RELATED APPLICATIONS

Figure 1:
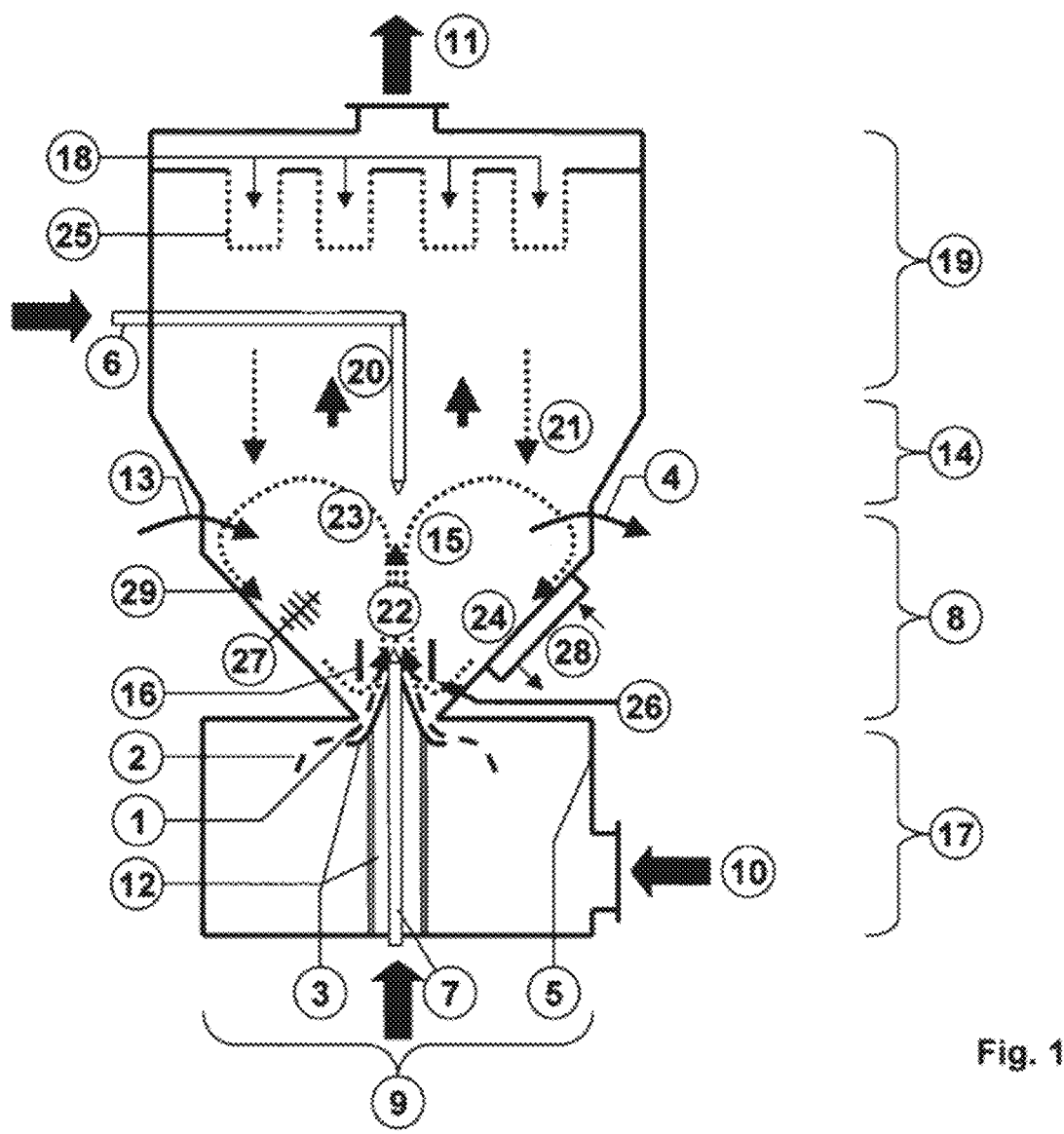

This application is the National Stage entry under 35 U.S.C. § 371 of International Application No. PCT/EP2020/060278 filed Apr. 9, 2020, published as Publication No. WO 2020/208202 on Oct. 15, 2020, which claims benefit of foreign priority of European Patent Application 19168685.6, filed on Apr. 11, 2019, the entireties of which are herein incorporated by reference.

FIELD OF INVENTION

The invention relates to a method for the continuous production of active ingredient granules, the granules themselves and their use, in particular for the production of tablets. The invention also relates to controlled release dosage forms. Active substances with poor flowability are used as active ingredients. The granulate is intended in particular for processing into tablets with an active ingredient content of more than 20% by weight and in particular more than 50% by weight, based in each case on the total weight of all components of the tablet.

BACKGROUND OF THE INVENTION

After production and purification, active pharmaceutical ingredients are usually obtained in a form that requires extensive further processing steps in order to convert the active ingredient into a dosage form. In particular, the active ingredient is often not obtained in the form of particles that can be readily formulated.

The necessary work-up steps include comminuting, grinding, sieving and the like. It is also known to produce active ingredient powders by spray-drying active ingredient solutions.

As a rule, however, active ingredient powders also have to be further processed before the production of dosage forms, such as tablets, is possible, because fine particle forms of active ingredients are associated with processing disadvantages. These disadvantages often include a lack of flowability. Another disadvantage is that fine powders often have poor stability. They tend to aggregate and clump.

In order to avoid such disadvantages, it is common to provide granules.

Granules which contain an active ingredient and optionally one or more excipients can be used to produce dosage forms, for example by pressing them into tablets alone or together with other components. Active ingredient-containing particles can also be filled into capsules or used in the form of a powder for a suspension or solution. They can also be provided with coatings.

A number of methods are known for the production of granules. These methods often operate as batch methods. A preprocessed, usually ground and sieved active ingredient is used.

The properties of the granules obtained are not always satisfactory, in particular with regard to flowability and stability.

The prior art also contains proposals to produce granules using spouted bed apparatuses. It is known from DE 103 22 062 A1 to produce granules of different materials by introducing liquids into a solids flow of a spouted bed apparatus. However, the application mentioned deals neither with the particularities of pharmaceutical active substances nor with the conditions that are suitable for processing such substances.

DE 100 04 939 C1 relates to a controllable gas inflow device for spouted bed apparatus.

WO 2004/108911 A2 describes manufacturing methods for enzyme granules and the granules of this type. A spouted bed apparatus is used for production. The application does not deal with the production of tablets or the ability of the granules to be tableted.

WO 2008/110374 A2 relates to pellets containing a pharmaceutical substance with a breaking strength of more than 0.001 newtons, methods for their production and pharmaceutical preparations based on such pellets. It is shown that spherical mannitol pellets with a uniform particle size grain distribution and smooth surface can be produced from a mannitol solution and that such pellets can be coated with an active ingredient layer by layering the active ingredient.

While the above documents contain no reference to the processing of active ingredients with poor flowability, such as active ingredients that are in a form that is characterized by a Hausner factor of 1.19 or greater, the production of dosage forms with such active ingredients is fundamentally known.

Numerous patent applications and publications deal with the formulation of metformin and its acid addition salts.

O. R. Arndt and P. Kleinebudde, AAPS PharmSciTech. 2018 July; 19 (5): 2068-2076, point out that metformin has poor tableting properties and poor flowability and is therefore typically wet-granulated with a binder before tableting. However, this is viewed as disadvantageous because of the associated costs. A dry method by means of roller compaction is therefore proposed.

U.S. Pat. No. 6,667,054 B2 describes tablets which contain metformin hydrochloride. They are made from a dry mixture of metformin hydrochloride and methyl cellulose.

U.S. Pat. No. 6,117,451 describes a mixture of a crystalline metformin hydrochloride powder and powdered excipients which can be pressed directly into tablets.

H. Takasaki et al., Results in Pharma Sciences 5 (2015) 1-7 describe a moisture-activated dry granulation of metformin hydrochloride.

B. S. Barot et al., Acta Pharm. 60 (2010) 165-175, point out that metformin hydrochloride is hygroscopic and has stability problems, and describe the development of a directly compressible metformin hydrochloride by spray drying. This leads to a product with approximately spherical particles which are typically less than 50 µm in diameter.

In addition, studies have been carried out on the release of metformin from dosage forms in order to determine where in the gastrointestinal tract the active ingredient should be released in order to achieve a good effect. In particular, it has been suggested that the release is only particularly advantageous in deeper intestinal sections (H. Schatz, New Findings on Metformin (2016).

Https://www.diabsite.de/aktuelles/nachrichten/2016/160503b.html).

Regardless of all the proposals in the prior art, there is still a need for improved methods for the production of dosage forms which contain an active ingredient with poor flowability, in particular if the active ingredient is contained in the dosage form in a high proportion by weight.

SUMMARY OF THE INVENTION

One object of the invention is to provide a continuous method for the production of an active substance granulate, the active substance being an active substance with poor flowability. The method should be particularly suitable for active substances which are to be processed into dosage forms with a high active substance content. The method should enable a high throughput and a high yield with adjustable granulate properties (such as particle diameter, moisture, bulk density).

Another object is to provide a method which makes it possible to adjust the particle size of the granulate particles.

A further object of the invention is to produce granulate particles which contain at least one active ingredient and which exhibit good flowability.

In addition, it is an object to provide granules with a high level of stability. In particular, the granulate particles should not aggregate or clump together.

Another object is to provide a method for producing a semi-finished product, the semi-finished product consisting of an active ingredient and at least one excipient and preferably being able to be further processed into tablets.

It is also an object to provide a method for producing tablets.

Finally, one object is to provide controlled-release dosage forms and methods for their production. The dosage forms should release the active ingredient depending on the pH value, for example. In particular, dosage forms are provided which only release the active ingredient in deep sections of the intestine, such as the ileum or the colon.

According to the invention, it has now been found that the continuous production of an active ingredient-containing granulate is possible by introducing droplets of a solution or suspension containing the active ingredient into a process space in which the liquid evaporates, the droplets being guided with the help of a suitably temperature-controlled process gas so that particles that are already in the process space come into contact with droplets that still contain at least enough liquid so that they are attached to the particles.

The method according to the invention for the continuous production of an active ingredient granulate accordingly comprises the following steps:
 (a) preparing a spray composition by dissolving or dispersing an active ingredient and optionally one or more excipients in a liquid;
 (b) providing solid particles in a process space;
 (c) introducing droplets of the spray composition into an injection zone of the process space in which the liquid evaporates;
 (d) repeatedly guiding the solid particles back past the sprayed droplets in the process space with the aid of a process gas jet, so that at least a portion of the droplets, which may have already lost part of the liquid contained, comes into contact with solid particles and larger solid particles are formed through agglomeration;
 (e) removing the active ingredient granulate from the process space in the form of solid particles,
 wherein the active ingredient in the form used has a Hausner factor of 1.19 or greater, in particular 1.25 or greater.

In contrast to the production of particles by spray drying in a conventional spray tower, according to the invention, the particles formed are circulated in the process space until they have reached the desired size through repeated agglomeration of droplets of the solution or dispersion and evaporation of the liquid.

In the method according to the invention, the growth of the particles can therefore be controlled.

The granulate obtained can be processed into tablets. Compared to known granulates, it has improved properties, in particular with regard to stability and flowability.

The granulate can also be processed into coated dosage forms, for example dosage forms that release the active ingredient depending on the pH value, in particular dosage forms that only release the active ingredient in the ileum or colon.

BRIEF DESCRIPTION OF THE FIGURES

The invention is explained in more detail below with reference to figures.

In FIG. 1, a system for performing the method according to the invention is shown schematically.

FIG. 2 shows a typical particle size distribution.

FIG. 3 shows a micrograph of a typical sample.

FIG. 4 shows a micrograph of a further sample.

DETAILED DESCRIPTION OF THE INVENTION

The granulate particles produced according to the invention contain an active ingredient. In the form used, the active ingredient has a Hausner factor of 1.19 or greater, in particular 1.25 or greater.

The Hausner factor is determined as the ratio of tamped density to bulk density. The tamped density is determined on the basis of the tamped volume, which is obtained by mechanically tamping a sample in a measuring cylinder until practically no change in volume is observed.

Hausner factors in the range from 1.00 to 1.11 indicate excellent flowability; in the range from 1.12 to 1.18 the flowability is good.

At higher values it is desirable to improve the flowability. The method according to the invention makes it possible, starting from an active ingredient with lower flowability, for example a Hausner factor of 1.19 or greater or 1.25 or greater, to obtain an active ingredient granulate with improved flowability, which is preferably characterized by a Hausner factor of 1.18 or smaller, and in particular 1.11 or smaller.

Active ingredients can arrive at production in different forms. According to the invention, the active ingredient used has a form with poor flowability, as indicated by the specified Hausner factors of 1.19 or greater and, in particular, of 1.25 or greater.

The improvement in flowability is of particular interest for active ingredients which are administered in large doses and for which it is therefore desirable that they make up a large proportion of the weight of the dosage form that is offered to the patient. According to the invention, active ingredients in particular which are processed into dosage forms with an active ingredient content of more than 50% by weight, based on the total weight of all components, are used.

Exemplary active ingredients are paracetamol, ibuprofen, carbamazepine, caffeine, lanthanum carbonate; strontium ranelate; pradigastat sodium; mycophenolate sodium; elagolix; eprosartan, especially as the mesylate; irbesartan; amoxicillin; levofloxacin; sevelamer, especially as the hydrochloride or carbonate; sofosbuvir; alisikiren; celecoxib; mesalamine.

In one embodiment, the active ingredient is not metformin or a pharmaceutically acceptable salt thereof, such as the hydrochloride.

According to one embodiment, the granulate particles consist of the active ingredient.

In addition to the active ingredient, the granulate particles can also contain one or more excipients. Any pharmaceutically suitable excipient can be used as an excipient. In particular, excipients are used that are typically used for the production of granules and tablets. Exemplary excipients are binders, lubricants, disintegrants and fillers.

A preferred excipient is a binder. Binders promote the binding of the granulate particles during tableting.

In one embodiment, they also support the formation of the granulate particles, in particular when active ingredient is wholly or partially dispersed in the liquid.

Exemplary binders are polyvinylpyrrolidone (PVP), vinylpyrrolidone-vinyl acetate copolymers, hydroxypropyl cellulose (HPC) and hydroxypropyl methylcellulose (HPMC). PVP is preferred.

The binder can be used, for example, in an amount of 0.1 to 10% by weight, preferably 1 to 7% by weight and in particular 2.5 to 5% by weight, based on the dry matter content.

In the method according to the invention, a spray composition is sprayed into a process space. The spray composition is a solution or a suspension.

Any liquid which does not react or does not react to a significant extent with the active substance and which can be removed under conditions which do not lead or do not lead to any significant extent to the decomposition of the active substance can be used as the liquid for preparing the solution or suspension.

A preferred liquid contains water. In particular, the liquid is water.

The spray composition contains the active ingredient and optionally one or more excipients. The spray composition preferably contains a high concentration of active ingredient and/or excipients.

The spray composition can also contain ingredients in undissolved form. In a preferred embodiment, the saturation solubility of one or more of the constituents is exceeded, so that a suspension is present.

With a high dry matter content in the spray composition, less liquid has to be evaporated to obtain the desired solid particles, allowing higher throughput. A high dry matter content is therefore preferred. It is also preferred to use a suspension.

The dry matter content of the spray composition is typically at least 25% by weight, preferably at least 40% by weight, in particular at least 50% by weight and most preferably at least 65% by weight.

The dry matter content relates to the total weight of the solids used, relative to the total weight of the spray composition.

The proportion of the active ingredient in the dry matter content is typically at least 70% by weight, preferably at least 80% by weight and in particular at least 90% by weight. It can be 100% by weight.

In the method of the invention, droplets are formed from the spray composition. The droplets from the solution or suspension are flowable.

In the process space they lose liquid due to evaporation. Small solid particles can be formed from the droplets.

It is characteristic of the method according to the invention, however, that particles that are already in the process space come into contact with droplets that still contain at least enough liquid so that they are attached to the particles. When in contact with the solid particles, the droplets must stick together at least on the surface.

Such an attachment allows particles of sufficient size to be formed.

To this end, it is essential that the agglomeration of the particles is made possible by previously introduced particles, i.e., particles already introduced into the process space in solid form, or particles formed by spraying in from the spray composition, repeatedly coming into contact with droplets of the spray composition, so that aggregates are formed. The solid particles produced according to the invention are typically aggregates of globules that are firmly connected to one another.

In the method according to the invention, the particles are moved within the process space with the aid of the process gas jet, which is guided in a defined manner, so that a circulating flow of solids is generated. The flow of solids leads into the area of the device (injection zone) in which droplets that can be attached to solid particles are introduced.

According to one embodiment, particles that have reached a desired size can leave the process space. Smaller particles remain in the process space so that they can come into contact with droplets again. According to another embodiment, a portion of the solid particles is removed from the process space. The removed material is classified and small particles can be returned to the process space. Excessively large particles can also be returned to the process space after being comminuted.

The process gas can be, for example, air or an inert gas such as nitrogen, carbon dioxide or a noble gas.

The process gas jet is essential both for the transport of substances and for the transport of heat. According to the invention, the temperature of the process gas jet is selected such that the sprayed droplets come into contact with particles that have already solidified, with the formation of larger particles. In particular, such temperature conditions are provided in the process space that the product is not exposed to any temperature conditions that impair its stability, but on the other hand sufficient drying is ensured by evaporation of liquid.

The process gas jet typically has a temperature in the range from 60 to 100° C. The product temperature is typically 30 to 60° C.

The process gas jet preferably has a temperature in the range from 70 to 90.degree. The product temperature is preferably 35 to 50° C.

In a particularly preferred embodiment, the process gas temperature is 80° C. and the product temperature is 40° C.

According to the invention, droplets from the spray composition and solid particles are brought into contact with one another in a spouted bed. Spouted bed is understood to mean that the completely fluidized solid particles are in a closed solids flow that is stable over time. The spouted bed is generated with the help of the process gas jet, which is guided in a defined manner. There are three fluidization states or zones within the spouted bed. In a first zone or ejection zone, the solid particles are accelerated under the action of the process gas jet, which is guided in a defined manner, the particles in this zone moving in the direction of flow of the process gas jet. The process gas jet is typically guided vertically upwards. Accordingly, in the ejection zone of the spouted bed there is a predominantly vertical upward flow. In a subsequent second zone or fountain zone, the particles change their direction of flow. There is predominantly a cross flow. Eventually the particles enter a third zone or return zone. There the particles then move downwards until they finally come back under the influence of the process gas jet, which is guided in a defined manner, and are again carried along by it in the first zone. In the return zone, the particles typically move under the influence of gravity.

The spray composition can be sprayed through two-fluid and multi-fluid nozzles. It is also possible to effect the spraying through pressure nozzles. Alternatively, dropletization can be carried out using rotary atomizers, jet cutters, ultrasonic dropletizers and other devices known to the person skilled in the art.

According to the invention it is possible to form nuclei from solid particles, by spraying droplets of a spray composition into the process space and drying these droplets, and these are then brought into contact with further droplets in order to form particles of the desired size. As an alternative or in addition, solid particles in the method can be supplied from the outside. For example, excessively small particles removed from the process can be returned to the process space as seed material. Likewise, excessively large particles or agglomerates of particles removed from the process can be comminuted by any comminution unit and returned to the process space as seed material.

The particles formed by the method according to the invention are removed from the method space. The material discharge of the finished product from the process space or a material transport into a process space further downstream can take place, for example, in the area of the transition from the cross flow to the downward flow of solids. According to one embodiment, the particles discharged from the process space are not classified. According to another embodiment, the particles discharged from the process space are classified and removed by one or more sifters.

The method according to the invention can be carried out, for example, with the aid of a device as described in DE 103 22 062 A1. The content of this application is incorporated into the present application by reference.

The method according to the invention is preferably carried out using a device as shown in the accompanying figure. This is explained in detail below.

The process gas 10 (usually heated air) is fed to a supply air chamber 17 with a rectangular cross section 9 and delimiting side walls 5. The process gas 10 is distributed in the supply air chamber 17 and enters the process space 8 via gap openings 1 in the form of gas jets 2. The process gas flow, which preferably enters the gap 1 horizontally, is deflected by the deflecting part 3, preferably upwards into the process space 8, and flows into the apparatus as a type of free jet. Furthermore, the apparatus cross-section can optionally increase in the expansion zone 14, so that the speed of the process gas flow decreases steadily towards the top. The gas leaves the apparatus as exhaust gas 11 above the expansion zone 14 via the exhaust air part 19, into which a dedusting system (for example filter cartridges or textile filter elements) can optionally be integrated.

In the process space 8 there is a large number of particles which are carried upwards by the process gas jet. Solid particles can be introduced into the process space at the beginning of the method; however, the method can also be started by generating solid particles from sprayed-in spray composition.

In the upper area of the process space 8 and in the expansion zone 14 located above it, the gas velocity decreases, so that the upwardly flowing particles emerge laterally from the gas jet 23 and fall back into the process space 8. The process space 8 is delimited in the lower area by inclined side walls 29. As a result of this lateral inclination, the particles are conveyed under the action of gravity via the return zone 24 in the direction of the gas inlet gap 1, where they are then carried along again by the process gas into the process space 8.

This mechanism creates a very uniform solids circulation 15 consisting of an upward flow and a return in the direction of the process gas inlet. As a result, even with very small amounts of particles in the process space 8 in the core zone above the deflection part 3, there is a high particle density. In this area, one or more spray nozzles 7 are arranged, which spray upwards in the same direction as the process gas jet and serve to introduce the spray composition.

The high particle loading in the core zone results in very advantageous conditions for the heat and mass transfer in the spray zone 22. The spray composition rapidly loses liquid by evaporation. When solid particles that are already in the process space come into contact with droplets of the spray composition, which may have already lost some of the liquid contained, larger particles and aggregates of particles are formed.

The process gas can discharge some of the particles as well as fine material and dusts from the process space 8 as exhaust air 20 containing solids. The filter system optionally integrated in the exhaust air part 19 or dedusting systems connected downstream of the apparatus can be used to remove these particles. In the case of an integrated dedusting system 25, compressed air pulses 18 can be used, for example, in order to return the retained particles as separated solids 21 to the process space 8.

Compared to fluidized bed apparatuses with integrated filter systems, the return of dust is made easier by the fact that the upward process gas flow is essentially localized and thus the particles to be returned can safely sink outside of the gas jet. This mechanism is additionally promoted by the suction effect in the vicinity of the gas inlet gap 1. Alternatively, particles separated from the exhaust air can be returned to the process space 8. For this purpose, various types of feeds 26 can be arranged in the lower region of the inclined side walls 29. Due to the high speed of the process gas jet in the vicinity of the gas inlet gap 1, the fine particles are drawn in and fed to the spray zone 22, where they are wetted with spray composition and take part in the growth process.

Optionally built-in guide plates 16 stabilize the particle circulation.

For continuous process management, the apparatus can optionally be equipped with different entry systems 13 for solids. In this way, for example, particles which can be obtained by comminuting, for example, (too large) granules and/or which consist of granules that are too small can be fed into the process. These particles then serve as granulation nuclei or as a starter filling to shorten the start-up time. In addition, additives which are to be embedded in the granules can be fed in solid form into the process.

Furthermore, the apparatus can be provided with discharge elements 4 in order to be able to remove particles from the process space 8. This can be done, for example, through an overflow or through a volumetric discharge element (e.g., a rotary valve) or also through a gravity sifter (e.g., a zigzag sifter charged with sifting gas or a riser pipe sifter).

Mechanical units 27 can optionally be attached to the inclined walls in the process space 8, but preferably in the area of the return zone 24, in order to produce sufficient fine material as nuclei for the granulate formation process by comminution. Furthermore, the return zone 24 can optionally be used for positioning heaters or other heat transfer devices 28. For example, the apparatus wall can be doublewalled in order to use it, for example, for heating or cooling the walls using liquid or gaseous heat transfer media. In this way, optimal surface temperatures can be set.

In the process space 8 or in the overlying apparatus parts, the expansion zone 14 and the exhaust air part 19, spray nozzles 6 can optionally be arranged, which preferably spray downwards but also partially upwards. Here, too, the liquid formulation can be injected in order to generate granulation nuclei in the apparatus, for example by spray drying/spray solidification. Alternatively, additives or other components can be sprayed in in liquid form via some of the spray devices 6 and 7 and thus embedded homogeneously in the granulate structure. When the spray nozzles 7 pass through the temperature-loaded supply air chamber 17, the liquid-carrying parts can optionally be provided with insulation or various cooling or heating systems 12 in order to prevent damage to the liquid formulation.

An advantage of the process according to the invention is the very simple structure, which combines high operational reliability and insensitivity to malfunctions with very good cleaning options. This creates improved production conditions, particularly with regard to pharmaceutical and hygiene requirements when changing products.

Another advantage is that the active ingredient used does not need to be ground before further processing. After adding tableting excipients, further processing into tablets is possible.

The method according to the invention allows the production of granules in high yield. There is practically no loss of active ingredient, since finely divided material can be fed back into the process or, in the case of internal classification, is not even discharged.

The present invention also relates to the granules produced according to the invention. The granules are obtained by the method according to the invention and have a $d_{50}$ of 50 to 1200 µm, for example from 100 to 600 µm, preferably from 150 to 500 µm.

In addition to or independently thereof, the granules have a bulk density of 0.400 to 0.900 g/ml, preferably of 0.500 to 0.600 g/ml.

The product according to the invention is flowable.

The product according to the invention has a high stability. In particular, there is no aggregation or clumping during storage.

Granules as obtained above can also be further processed into controlled-release dosage forms. Such forms of administration include, in particular, forms of administration in which the active ingredient is released in a pH-dependent manner. Controlled-release dosage forms which only release the active ingredient in deeper intestinal sections, such as the ileum or the colon, are preferred.

According to one embodiment, granulate particles are provided with one or more functional coatings for controlling the release of active ingredient.

Suitable coatings ensure a pH-dependent release of the active ingredient. (Enteric) coatings, for example, are known. Such coatings can be applied according to the invention.

It is also possible to use coatings that only dissolve in the distal part of the small intestine (ileum) and in the subsequent colon. They control the release of active ingredient in such a way that at least 60%, preferably at least 70% and in particular at least 80% of the active ingredient are released in the ileum and colon.

The above-mentioned coatings can be applied, for example, with the aid of a Wurster method.

Polymer compositions, in particular polymer compositions which lead to enteric coatings, are suitable as coating materials. According to the invention, coatings which dissolve at pH values above 5.5 can be used. According to the invention, coatings can also be used which dissolve at pH values above 6.5, such as above 6.8 and in particular above 7.0.

Suitable coating materials are polymers obtained by polymerizing acrylic acid, methacrylic acid and their esters.

Preferred polymers are methacrylic acid-methyl methacrylate copolymers (1:2), commercially available as Eudragit® S 100 (powder) and as Eudragit® S 12.5 (organic solution), as well as poly (methyl acrylate-co-methylmethacrylate-co-methacrylic acid) 7:3:1, commercially available as Eudragit® FS 30 D (aqueous dispersion).

These polymers can be used alone or in combination with other polymers, such as other Eudragit® types, in order to regulate the desired release behavior.

Customary excipients and additives can be mixed with the polymers.

As an alternative to coating granulate particles, controlled-release dosage forms can also be provided by processed granulate particles obtained by the method according to the invention into tablets or filling them into capsules, which are then provided with one or more coatings. The above information applies to the coatings.

According to one embodiment, release from the coated tablets or capsules takes place in such a way that at least 60%, preferably at least 70% and in particular at least 80% of the active ingredient is released in the ileum and colon.

Investigation Methods

The particle analyses are carried out with the optical image evaluation system Camsizer XT (Retsch). The CAMSIZER XT uses the principle of digital image processing. The dispersed particle stream passes two LED stroboscopic light sources. The shadows projected by the particles are recorded by two digital cameras. The particle diameter is determined as the shortest chord of the measured set of maximum chords of a particle projection.

A particle population can be characterized by a cumulative value $Q3(x)$, which indicates the percentage volume fraction of particles smaller than x relative to the total volume of the particles. The value $d_{50}$ denotes the value x at which $Q3(x)$ is 50%.

The moisture content of the product is determined with the Sartorius MA 100 moisture analyzer (halogen lamp; 105° C. and automatic switch-off). The moisture content of the granules according to the invention is typically less than 1% by weight.

For the optical assessment of the samples, recordings are made with the AXIO microscope (Zeiss).

To characterize the material, the test samples are measured with the D2 Phaser (Brucker) X-ray diffractometer.

Bulk volume/bulk density are measured in a measuringcylinder. The sample is carefully poured into the measuring cylinder. It must not be compacted (knocked or bumped).

After determining the bulk volume/bulk density in the measuring cylinder, the same sample is mechanically tamped in the cylinder (tamping volumeter ERWEKA SVM 20) and the volume is read off again. This is continued until practically no further changes in volume are observed.

Bulk and tamped density are calculated from the measured values of mass and bulk or tamped volume.

The angle of repose is the angle of flow inclination that results when a product flowing freely from a funnel forms a cone on a surface. The determination is made with a RTG01 trickle tester.

EXAMPLES

The invention is illustrated by means of specific application examples, without being restricted in any way. The examples were carried out with metformin hydrochloride as the active ingredient. They can be carried out in an analogous manner with other active ingredients to be used according to the invention.

Example 1

Preparation of Spray Compositions

The metformin hydrochloride to be processed was completely clumped into a large lump. The large lump of active ingredient first had to be broken into small pieces, which were then crushed further with the help of a rotor-stator mill.

A suspension with a dry matter content of 50% in distilled water was prepared from this. The suspension was stirred with a paddle stirrer and then passed through a 500 µm sieve in order to prevent nozzle blockages. It was found that coarser components were still present in the suspension. The suspension was stirred again using an Ultra Turrax T-50 (IKA) for 10 minutes at 10,000 rpm. All suspensions of the following experiments were prepared in the same way.

In a further experiment, a solution of metformin hydrochloride was prepared. It was possible to obtain a solution in water with a dry matter content of 28%. The Ultra Turrax also had to be used for this.

Example 2

Preparation of a Metformin Hydrochloride Product without the Addition of Excipients The granulation tests were carried out continuously in a laboratory system with a spouted bed insert.

The spray composition was atomized with a bottom spray nozzle (two-substance nozzle; nozzle air temperature not heated).

A metformin hydrochloride solution in water with a dry matter content of 28% was sprayed into the apparatus.

The spray composition was conveyed from the storage container (5 l container; not heated) to the nozzle using a peristaltic pump.

Filters were arranged above the spouted bed. They were cleaned regularly by blasts of compressed air so that the dust remained in the process space.

The process air was conveyed through the speed-controlled exhaust fan. An electrical heating register was used to heat the air.

The product discharge was regulated by means of air flow in the zigzag sifter, so that, under stable operating conditions, the same amount of dry matter was discharged as dust-free granulate as was supplied with the spray composition.

The fine dust from the sifter was conveyed back into the process chamber.

According to the method described, active ingredient pellets consisting of 100% active ingredient could be obtained from the solution.

The process was very stable.

First of all, small particles were produced (sample A; $d_{50}$=123.2 µm).

The spray pressure was then lowered and the spray rate increased to encourage particle growth. Larger particles could then be produced (sample B; $d_{50}$=300.9 µm).

Example 3

PVP and Particle Size

For this example, a suspension of metformin hydrochloride in water with 5% by weight of PVP Kollidon K-30 (based on the dry matter) was prepared. The suspension had a dry matter content of 51.3%. The process was started with the remainder of the previous experiment.

A 2.0 mm nozzle was used. The suspension was stirred while spraying.

The product discharged from the process space had a $d_{50}$ of 197.6 µm.

The spray pressure was then lowered and the spray rate increased to encourage particle growth. The product discharged after the layer mass had been replaced had a $d_{50}$ of 423.6 µm.

Figure 2:
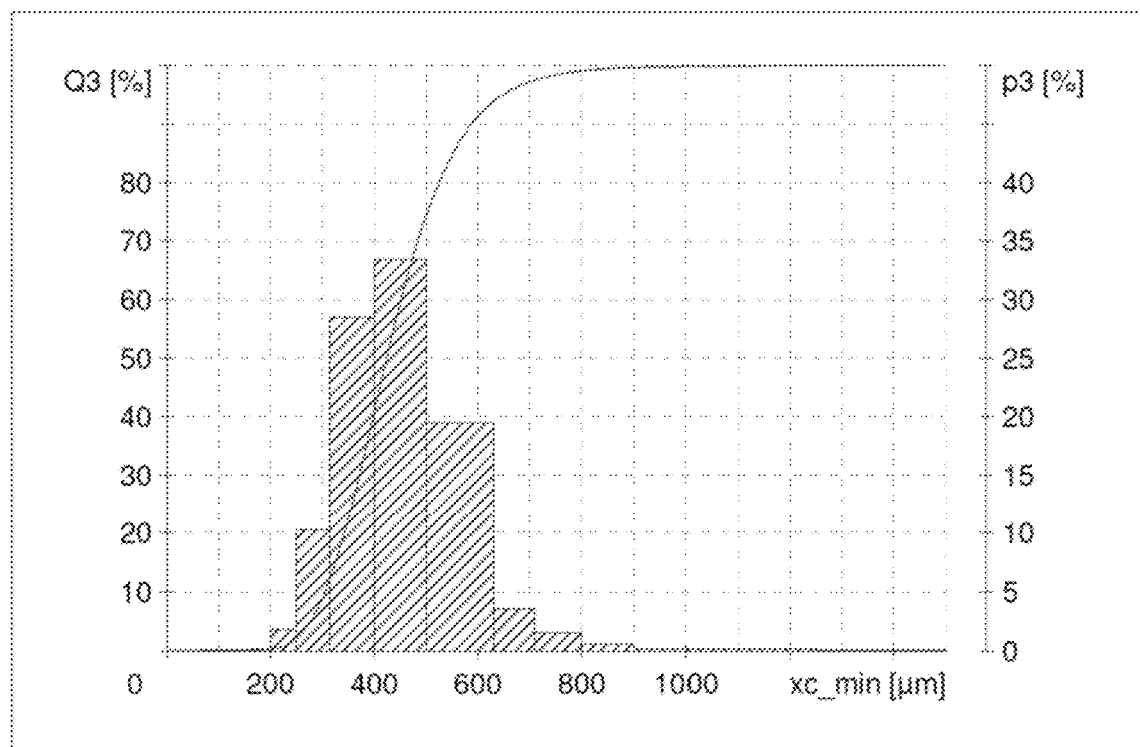
Figure 3:
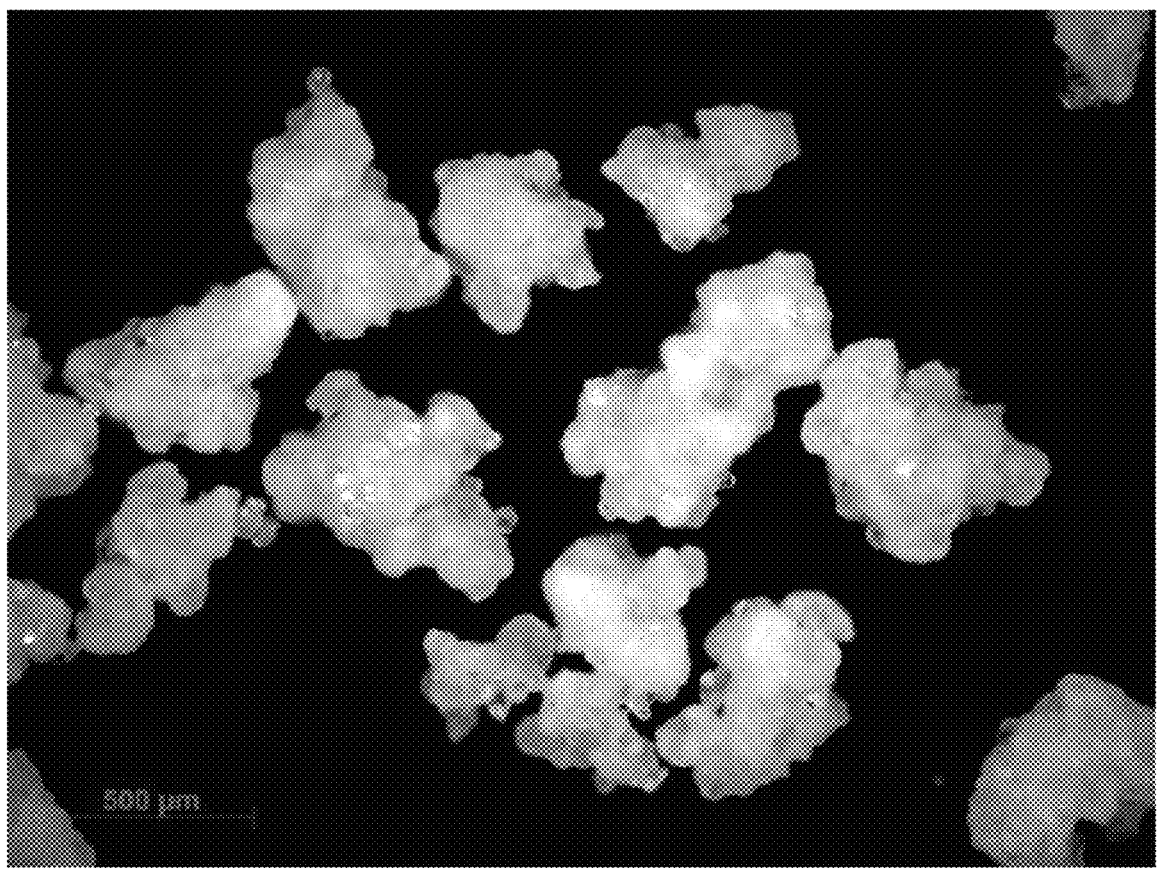
Figure 4:
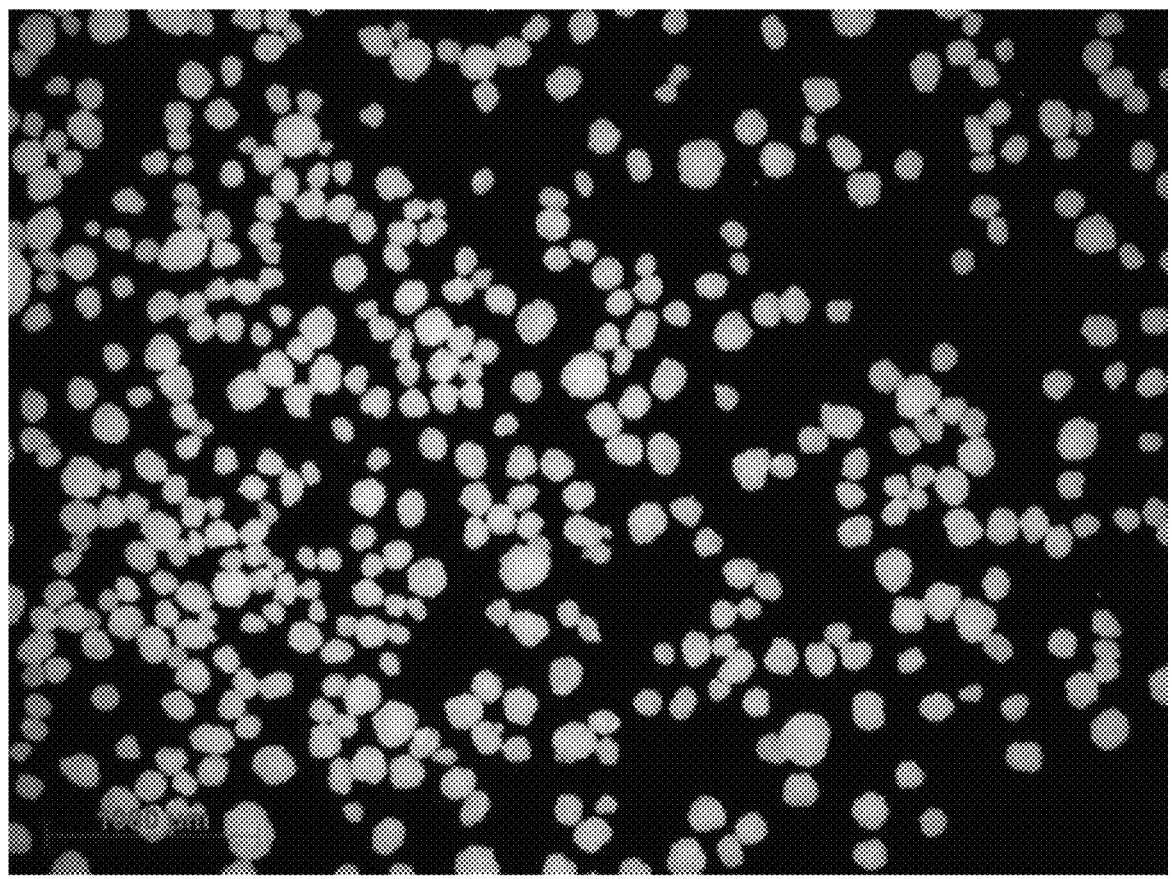

The particle size distribution of the product is shown in FIG. 2. The micrograph of a sample is shown in FIG. 3. The product particles obtained represent aggregates of firmly connected spheres.

It was possible to produce different particle sizes with a PVP content of 5% in the end product.

Example 4

Throughput

In this test, the process was to be further optimized. For this reason, an attempt was made to concentrate the suspension of metformin hydrochloride and PVP in water more highly. A suspension with a dry matter content of 69.4% was obtained. Based on the dry matter content, there was again 5% PVP in the suspension.

Despite the high viscosity, it was possible to spray the suspension. Because of the smaller amount of water that had to be evaporated, a large increase in throughput could be achieved (1.3 kg/h in example 3; 2.9 kg/h in the present example).

First, a small particle size was produced again ($d_{50}$=186.8 µm). Larger particles were then produced ($d_{50}$=475.3 µm). The process ended without nozzle blockages or other problems.

Example 5

Variation of the Binder Content

For this test, the PVP content was reduced from 5% to 2.5% (based on the dry matter). The concentration of the suspension was maintained (68.8%). After the layer mass had been exchanged, first small particles ($d_{50}$=184.7 µm) and then coarser particles ($d_{50}$=269.2 µm) were produced.

A suspension was prepared again for a further test (dry matter content 70.2%). This time only 1% PVP (based on the dry matter) was added. Here, too, a small particle size was initially produced ($d_{50}$=165.3 μm). Later larger particles ($d_{50}$=230.5 μm) were produced.

So again particles of different sizes can be produced.

Example 6

Flowability

Various parameters were determined that allow conclusions to be drawn about the flowability of products.

The pure active ingredient was slightly deagglomerated for the measurement so that the investigation could take place at all.

The Hausner factor was determined as the ratio of tamped density to bulk density. For values close to 1, good dosing accuracy can be expected; for values well above 1, the dosing accuracy can depend on vibrations. In the present case, a reduction in the Hausner factor for the samples according to the invention in comparison with the raw material shows an improvement in the metering accuracy.

The Carr index was determined using the formula 100× (bulk volume−tamped volume)/bulk volume. Smaller Carr indices show better flow behavior. A value less than 15 indicates a free-flowing product.

A small angle of repose shows good flow behavior.

TABLE 1

| Sample | Bulk volume ml | Weight g | Bulk density g/ml | Tamped volume ml | Tamped density g/ml | Hausner factor | Carr index | Angle of repose ° |
|---|---|---|---|---|---|---|---|---|
| 95% Metf./ 5% PVP | 174 | 98.9 | 0.568 | 163 | 0.607 | 1.067 | 6.322 | 6.22 |
| 97.5% Metf./ 2.5% PVP | 168 | 100 | 0.595 | 156 | 0.641 | 1.077 | 7.143 | 6.11 |

Example 7

Stability

Samples according to the invention were stored in sealed plastic bags for 3 months at room temperature. The good flowability was retained.

Example 8

Manufacture of Tablets

Tablets were made using metformin hydrochloride products as obtained in some of the preceding examples.

The composition and properties of the metformin hydrochloride products used are given in Table 2 below:

TABLE 2

| Product | PVP content | $d_{50}$ | Bulk density | Residual moisture |
|---|---|---|---|---|
| P1 | 5% | 197.6 μm | n.d. | 0.71% |
| P2 | 5% | 423.6 μm | 0.510 g/ml | 0.69% |
| P3 | 2.5% | 184.7 μm | 0.582 g/ml | 0.29% |
| P4 | 2.5% | 269.2 μm | 0.529 g/ml | 0.38% |
| P5 | — | 123.2 μm | 0.851 g/ml | 0.23% |
| P6 | — | 300.9 μm | n.d. | 1.06% |

In order to produce tableting mixtures, 1,000 parts by weight metformin hydrochloride product was mixed with 3 parts by weight magnesium stearate as a release agent and 31 parts by weight of croscarmellose sodium (AcDiSol®) as disintegrating agent, respectively.

A tablet press from Fette (102i) with a punch diameter of approx. 10 mm was used to produce biconvex tablets. The filling depth was 9 mm. A speed of 10,000 tablets per hour was used.

Further parameters are given in Table 3 below.

TABLE 3

| No. | Product | Web height mm | Pre-pressing force kN | Web height mm | Main pressing force kN | Dimensions mg |
|---|---|---|---|---|---|---|
| T1.1 | P1 | 4.7 | 3 | 4.2 | 6.8 | 382 |
| T1.2 | P1 | 5.2 | 1.4 | 4.7 | 3 | 381 |
| T1.3 | P1 | 4.3 | 4 | 3.8 | 9.4 | 372 |
| T2.1 | P2 | 4.7 | 1.4 | 4.2 | 3 | 346 |
| T2.2 | P2 | 4 | 2.5 | 3.5 | 6.7 | 328 |
| T2.3 | P2 | 3.5 | 4.6 | 3.2 | 9.3 | 320 |
| T3.1 | P3 | 4.2 | 4 | 3.75 | 9.1 | 370 |
| T3.2 | P3 | 4.3 | 3 | 3.85 | 7 | 376 |
| T3.3 | P3 | 4.7 | 1.6 | 4.3 | 3.1 | 359 |
| T4.1 | P4 | 4.9 | 1.5 | 4.5 | 3 | 373 |
| T4.2 | P4 | 4 | 4 | 3.5 | 9 | 350 |

TABLE 3-continued

| No. | Product | Web height mm | Pre-pressing force kN | Web height mm | Main pressing force kN | Dimensions mg |
|---|---|---|---|---|---|---|
| T4.3 | P4 | 3.9 | 2.7 | 3.5 | 6.2 | 332 |
| T5.1 | P5 | 5.5 | 3.3 | 5 | 7.2 | 453 |
| T5.2 | P5 | 5.2 | 4.4 | 4.7 | 10.5 | 445 |
| T6.1 | P6 | 4.9 | 3.8 | 4.4 | 11 | 442 |
| T6.2 | P6 | 5 | 1.3 | 4.5 | 4.7 | 414 |

In all cases tablets which had acceptable disintegration times could be obtained.

Example 9

Preparation of Coated Granular Particles

Coated granules are made from a metformin hydrochloride granulate. The purpose of the coating is to ensure that the active ingredient is released primarily in the ileum and colon.

Formulation of an exemplary coating suspension:

| | |
|---|---|
| EUDRAGIT ® FS 30 D (available from Evonik Roehm GmbH, Darmstadt, DE) | 2000 g |
| Talc (available from Merck KGaA, Darmstadt, DE) | 300 g |

-continued

| | |
|---|---|
| Triethyl citrate (TEC) (available from Vertellus Inc., Greensboro, USA) | 37.5 g |
| Water (demineralized) | 2350 g |

To produce the coating suspension, EUDRAGIT® FS 30 D, talc and TEC are mixed using a paddle stirrer (IKA GmbH & Co. KG, Staufen, DE). The suspension is passed through a 0.1 mm sieve.

The suspension has a solids content of 20.0% and a polymer content of 12.8%.

The suspension is applied to metformin hydrochloride granules ($d_{50}$=350 μm) using a fluidized bed method. For this purpose, a Glatt GPCG 1 fluidized bed system (Glatt GmbH, Binzen, DE) with a 1.2 mm nozzle (top spray) and an atomizing air pressure of 2 bar is used. Further process parameters are a spray rate of 7-10 g/min/kg, an inlet air temperature of 38-40° C. and an outlet temperature of 26-30° C.

The suspension is sprayed in until 30.0% by weight of polymer, based on the metformin hydrochloride granulate used, has been introduced.

The end product is then dried in the unit. To prevent agglomeration, 0.5% Aerosil® 200 (pyrogenic silicon dioxide) is added before drying.

REFERENCE SYMBOLS

1 Gap(s)
2 Gas jet(s)
3 Deflection part
4 Discharge element
5 Side wall
6 Spray nozzle(s) spraying in any direction
7 Spray nozzle(s) spraying upwards
8 Process space
9 Cross-section of a process step
10 Process gas
11 Exhaust gas
12 Insulation with cooling or heating system
13 Feed system
14 Expansion zone
15 Solids circulation
16 Baffle (s)
17 Supply air chamber
18 Compressed air pulses
19 Exhaust section
20 Solids-laden exhaust air
21 Separated and recycled solid matter
22 Spray zone
23 Particle exit from the gas jet
24 Return zone
25 Dedusting system
26 Feeders
27 Mechanical aggregates for size reduction
28 Heat transfer devices
29 Side wall

The invention claimed is:

1. A method for the continuous production of an active ingredient granulate, comprising the following steps:

(a) preparing a spray composition by dissolving or dispersing an active ingredient and optionally one or more excipients in a liquid;

(b) providing solid particles in a process space;

(c) introducing droplets of the spray composition into an injection zone of the process space in which the liquid evaporates;

(d) repeatedly guiding the solid particles back past the sprayed droplets in the process space with the aid of a process gas jet, so that at least a portion of the droplets, which may have already lost part of the liquid contained, comes into contact with solid particles and larger solid particles are formed through agglomeration; and (e) removing the active ingredient granulate from the process space in the form of solid particles, wherein the active ingredient in the form used, prior to the dissolution or dispersal in step (a), has a Hausner factor of 1.19 or greater.

2. The method according to claim 1, wherein the Hausner factor is 1.25 or greater.

3. The method according to claim 1, wherein the liquid is water.

4. The method according to claim 1, wherein the spray composition additionally contains a binder.

5. The method according to claim 1, wherein the spray composition has a dry matter content of at least 25% by weight.

6. The method according to claim 5, wherein the proportion of the active ingredient in the dry matter content is at least 70% by weight.

7. The method according to claim 1, wherein the spray composition is a suspension.

8. The method according to claim 1, wherein the provision of particles according to step (b) takes place by spraying the spray composition into the empty process space and evaporating the liquid in the process space.

9. The method according to claim 1, wherein in step (e) particles which have reached a predetermined size are removed.

10. The method according to claim 1, wherein solid particles which have not reached a specified size are returned to the process space.

11. The method according to claim 1, further comprising a step of comminution, wherein excessively large particles are returned to the process space after comminution.

12. The method according to claim 1, in which the particle size of the particles removed, expressed as the $d_{50}$ value, is 100 μm to 600 μm.

13. An active ingredient granulate, produced according to claim 1, the particle size, expressed as $d_{50}$ value, being 50 μm to 1200 μm.

14. The active ingredient granulate according to claim 13, provided with a coating for controlled release.

15. The active ingredient granulate according to claim 14, wherein the coating provides for pH-dependent release.

16. The active ingredient granulate according to claim 14, wherein the coating controls the release so that at least 60% of the active ingredient are released in the ileum and in the colon.

17. The method according to claim 1 or active ingredient granules according to claim 13, the active ingredient granules being intended for further processing into a tablet with an active ingredient content of more than 20% by weight, based on the total weight of all components of the tablet.

18. A method for producing a tablet with an active ingredient content of more than 50% by weight, based on the total weight of all components of the tablet, the method comprising the following steps:

(a) producing an active ingredient granulate, the active ingredient form used having a Hausner factor of 1.19 or greater and the method being a method according to claim 1;

(b) optionally producing a tableting mixture by mixing the active ingredient granulate with one or more excipients; and (c) producing a tablet by compressing the active ingredient granulate or, if a tableting mixture has been produced, this tableting mixture.

19. The method according to claim 18, wherein the tablet is coated with a controlled release coating.

20. The method according to claim 19, wherein the release takes place as a function of the pH.

21. The method according to claim 20, wherein the tablet releases at least 60% of the active ingredient in the ileum and in the colon.

* * * * *